Figure 1:
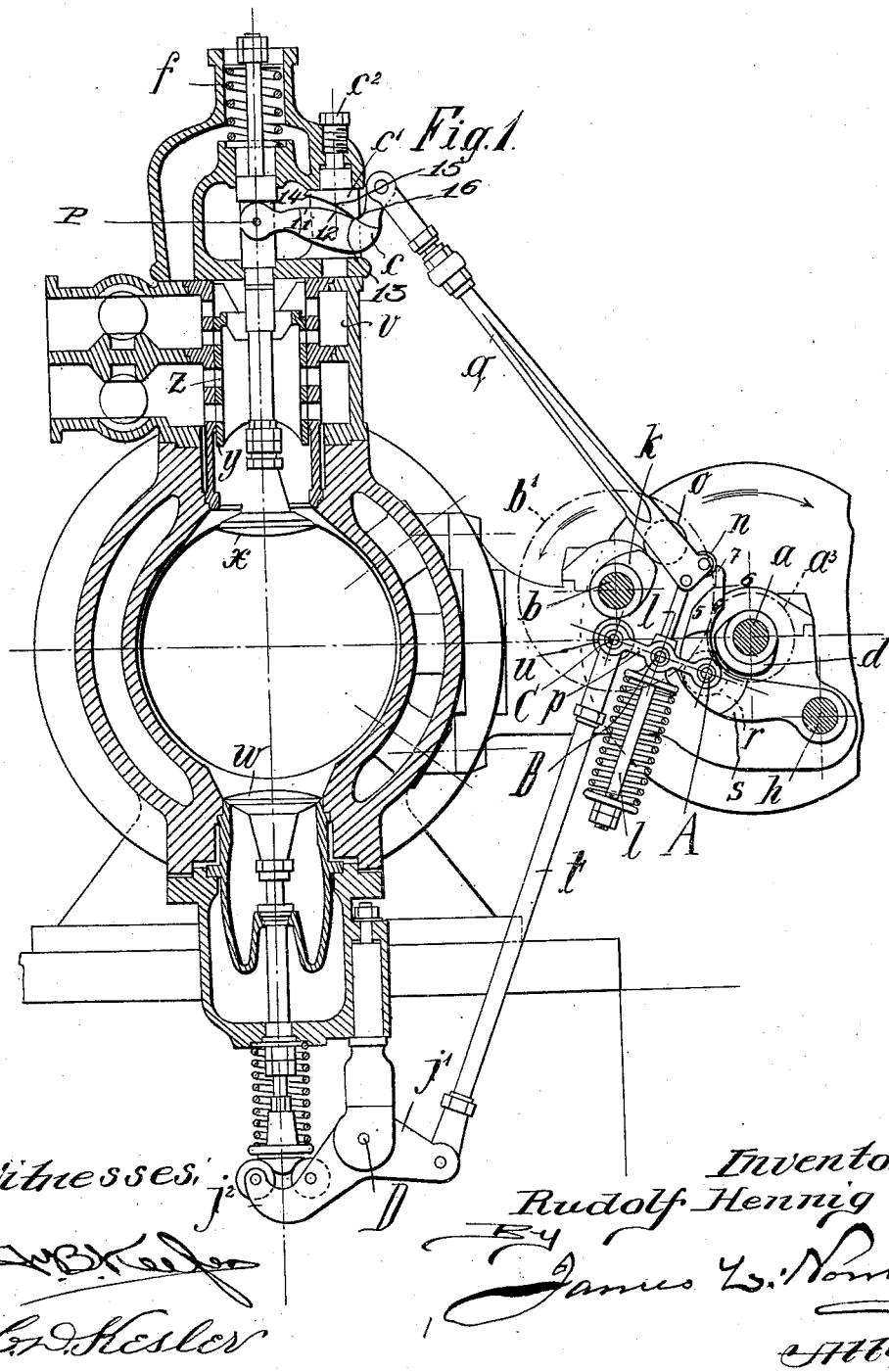

R. HENNIG.
VALVE GEARING FOR EXPLOSION ENGINES.
APPLICATION FILED FEB. 24, 1906.

910,680.

Patented Jan. 26, 1909.

R. HENNIG.
VALVE GEARING FOR EXPLOSION ENGINES.
APPLICATION FILED FEB. 24, 1906.

910,680.

Patented Jan. 26, 1909.
6 SHEETS—SHEET 4.

Fig. 4.

Witnesses:

Inventor
Rudolf Hennig
By
James L. Norris
Atty

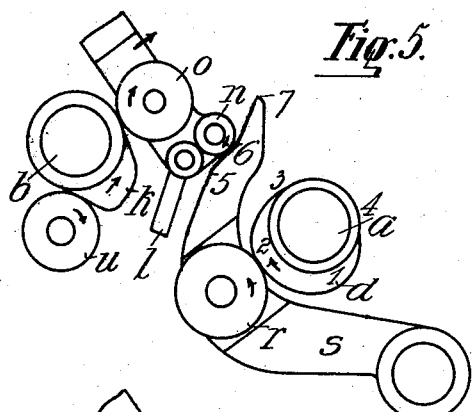
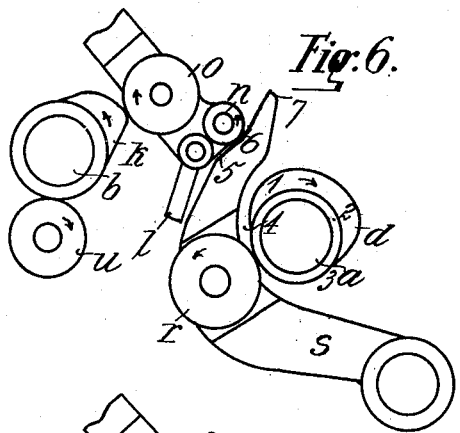
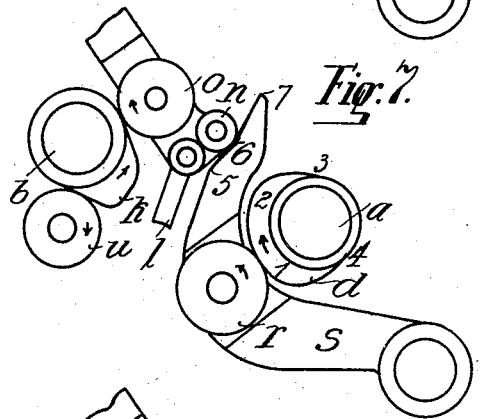
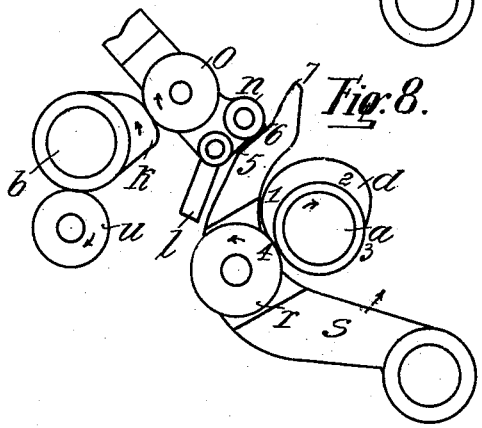
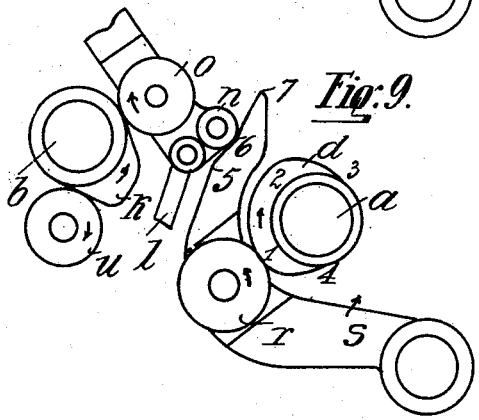

R. HENNIG.
VALVE GEARING FOR EXPLOSION ENGINES.
APPLICATION FILED FEB. 24, 1906.

910,680.

Patented Jan. 26, 1909.

UNITED STATES PATENT OFFICE.

RUDOLF HENNIG, OF ZWEIBRÜCKEN, GERMANY.

VALVE-GEARING FOR EXPLOSION-ENGINES.

No. 910,680.　　　　Specification of Letters Patent.　　　　Patented Jan. 26, 1909.

Application filed February 24, 1906. Serial No. 302,741.

*To all whom it may concern:*

Be it known that I, RUDOLF HENNIG, a subject of the King of Prussia, residing at Zweibrücken, Germany, have invented certain new and useful Improvements in Valve-Gearing for Explosion-Engines, of which the following is a specification.

This invention relates to a valve-gear whereby the admission valve of four-stroke-cycle explosion engines can be actuated in such a manner that it either opens at a constant or definite point in the travel of the piston and closes at a variable point in the travel of the piston, or opens at a variable point in the travel of the piston and closes at a constant point, for the purpose of governing the engine by varying the quantity of explosive mixture entering the cylinder and of improving the said mixture so as to obtain the best ignition.

If now the exhaust valve of the engine opens at a constant point in the travel of the piston and closes at a constant point before the opening of the admission valve, there plainly remains in the compression space a constant quantity of exhaust gases from the previous stroke. According to the first alternative method of governing, when the exhaust valve closes at the dead point and the admission valve opens at the same place, with the slightest possible depression in the atmospheric pressure there is a variable quantity of the explosive mixture to the constant quantity of exhaust gases in the compression chamber or space. According to the second alternative method of governing, the admission valve, after the exhaust valve is closed at the dead point, in the first place likewise remains closed. The exhaust gases from the compression chamber expand alone and thus produce a partial vacuum in the cylinder, which is greater the later the admission valve opens in the outward motion of the piston. The explosive mixture will be mixed so much the more intimately the greater the partial vacuum in the cylinder and consequently the greater its velocity of entrance.

Since the quantity of the explosive mixture necessarily decreases when the admission valve opens later, the most uniform mixture possible is produced, this being more especially the case with small charges and by this means very perfect combustion is obtained. In both cases (alternative methods of governing), the operations can be controlled during the admission of the explosive mixture in the most varied manner by means of the valve gearing.

My improved valve gearing is characterized by a cam which rotates with the side or way shaft which rotates at the same speed as the crank shaft and which is capable of being adjusted round the said shaft by the governor, a cam-lever moved by this cam and an actuating rod for the admission valve, said actuating rod sliding on the curved surface of this cam lever, which actuating rod is oscillated, during the admission or suction period only, by a cam or tappet on an auxiliary shaft rotating at half the speed of the side or way shaft, and to one end of which actuating rod there is connected by means of a roller lever the spindle of the admission-valve which is provided with a slide valve for controlling the supply of air and combustible gas or vapor, in which arrangement, the produced valve actuating rod extends through the axis of the cam-lever or near thereto, while a tensioning device is coupled to the other end of the actuating rod of the admission valve, which tensioning device acts by means of a coupling rod or a pair of coupling rods both on the actuating rod of the admission valve, and also on the cam lever and on the actuating rod of the exhaust valve, in order to cause these parts to press against the tappet and cam respectively.

Figure 2:
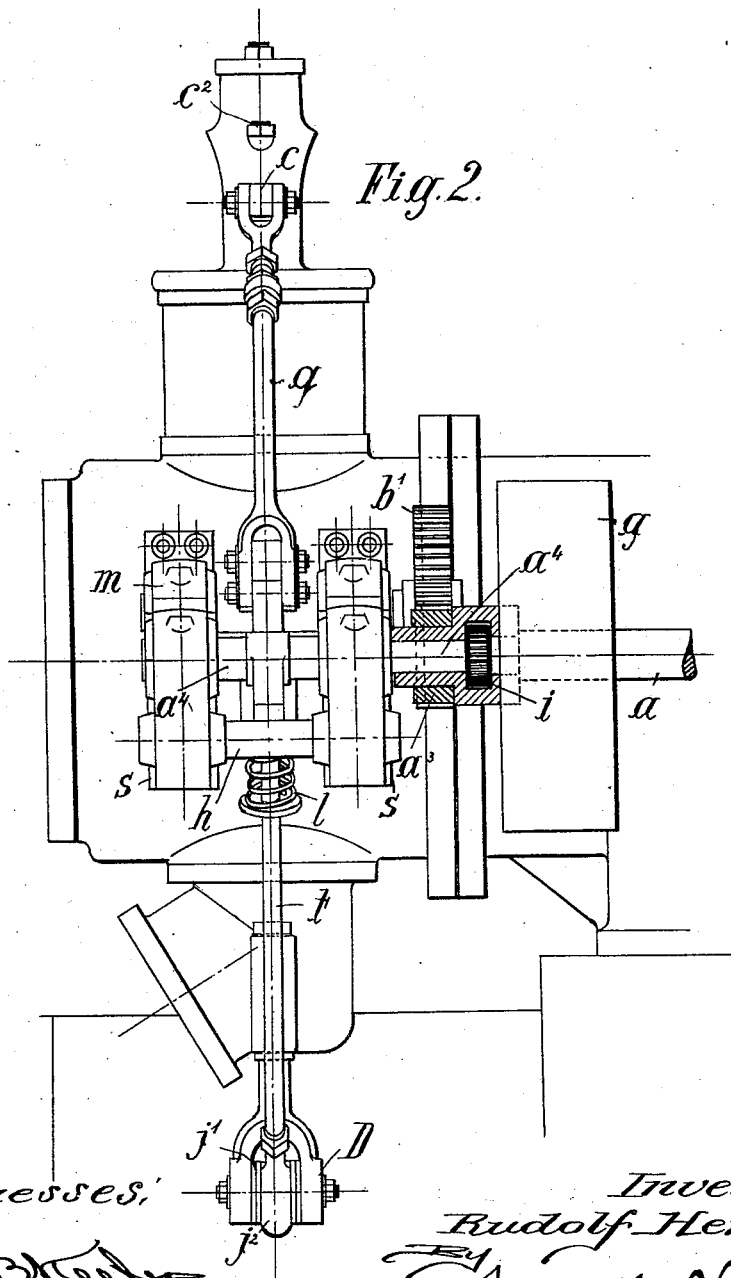
Figure 3:
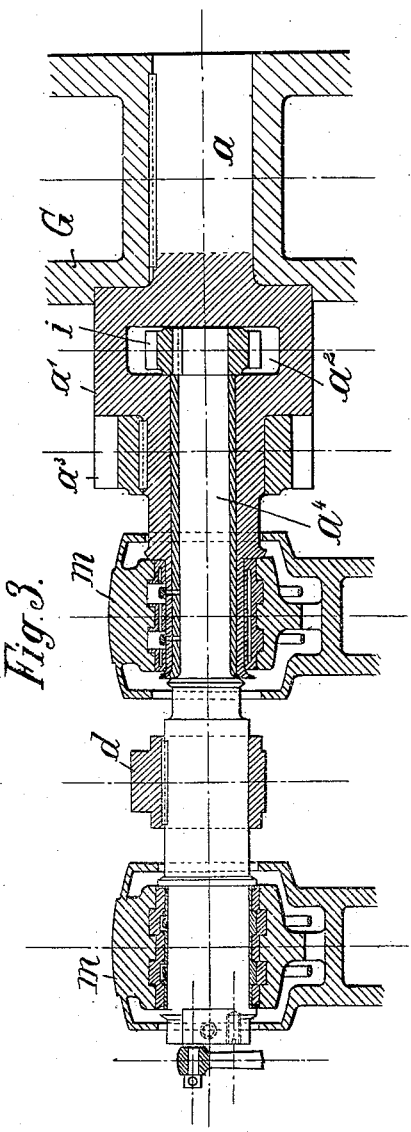

In the drawings, which form a part of this specification: Figure 1 illustrates in side elevation a valve gearing in accordance with this invention; Fig. 2 is a front elevation; Fig. 3 is an enlarged longitudinal sectional view showing the driving, side or way shaft and the governor shaft; Fig. 4 is a side elevation of the shaft governor upon an enlarged scale; Figs. 5 to 14 show the various positions of the parts of the valve gearing when the machine runs at full load, half load and unloaded, and Fig. 15 is a diagrammatical view illustrating the curved paths of the valve $x$.

The admission valve $x$ of the engine bears a piston valve $y$, the ports $z$ of which uncover the gas and air ports in the valve casing $v$ when the valves $x$, $y$ descend. The admission valve $x$ is moved by means of a roller lever $c$. The lever $c$ can roll with its surface 11, 12, 13, on a fixed roller surface 14, 15, 16 (Fig. 1). The lever $c$ is coupled by means of a pivot pin P to the valve-rod.

The roller-lever $c$ with a rigid track $c'$ has as roller-tracks or rolling surfaces the circular arcs 11, 12, 13 and 14, 15, 16. The center of the latter arc lies on the axis of the valve and the former circular arc is a piece of the circle passing through the said center.

Accordingly the radii of the circular arcs above mentioned are in the ratio of 1:2, and since the point P is a point of the small circle, P describes an exactly straight line in the rolling of $c$ on $c'$. Also the points 11, 12, 13 of $c$, as points of the small circle rolling without slipping, describe straight lines which extend through the center of the rigid circular roller track. The nut $c^2$ serving for the fastening of $c'$ to the valve-head has screw-threads. The roller-lever actuating mechanism is arranged only in view of noiseless opening and closing of the valve. The co-acting rolling surface $c'$ for this roller-lever $c$ is adjustable by means of a screw $c^2$. A spring $f$ assists the closing of the valve $x$. To the roller-lever $c$ is coupled a rod $q$, which is provided at its lower end with rollers $o$ and $n$ and also with a tensioning device $l$. The roller $o$ runs on a tappet $k$ on an auxiliary shaft $b$ which rotates at half the speed of the crank shaft of the engine. By the action of the tappet $k$, the rod $q$, is moved away from the auxiliary shaft $b$ during the suction or admission period. The roller $n$ meanwhile runs on part of a curved surface 5, 6, 7 on a cam-lever $s$ which is mounted so as to be capable of oscillating on the fixed shaft $h$. The curved surface 5, 6 is concentric with the shaft $h$, whereas the curved surface 6, 7 is eccentric thereto.

The cam-lever $s$ is moved by means of a roller $r$ from a cam $d$ which is controlled by a shaft governor G. The shaft-governor G is mounted on the driving side or way shaft $a$ (Figs. 3 and 4) and rotates at the same speed as the crank shaft of the engine. To its weighted arms $g$ (Fig. 4), which are connected by spiral springs $g'$ to the governor-casing, are coupled rack bars $i'$, $i^2$ which engage with a gear-wheel $i$ and are guided by rollers $g^2$, $g^2$.

The gear-wheel $i$ is arranged within a recess $a^2$ in a swelling $a'$ of the driving shaft $a$ and is fixed on the governor-shaft $a^4$ (Fig. 3), which is mounted on the one hand in the hollow shaft $a$ and on the other hand in the rear way-shaft-bearing $m$ and bears the governor cam $d$ which acts on the roller $r$ of the cam lever $s$.

On the driving shaft $a$ is fixed the gear-wheel $a^3$ (Fig. 3), which engages with a gear-wheel $b'$ fixed on the auxiliary shaft $b$ lying behind (Figs. 1 and 2).

In order that the roller $r$ shall always bear on the cam $d$, a lever or a pair of levers $p$ with three points of oscillation A, B, C are coupled to the lever $s$ by means of the bolt A. The point A coincides with the axis of the roller $r$ and the point C with the axis of the roller $u$ of the actuating rod $t$ for the exhaust valve. To the bolt B is secured the tensioning device $l$ which tends to move upwards both the point A and also the point C, in order that not only the roller $r$ is pressed against the cam $d$, but also the exhaust valve roller $u$ is pressed against the tappet $k$. The tappet $k$ thus serves for controlling both the admission and the exhaust.

The actuating rod $t$ for the exhaust valve engages at its lower end with the arm $j'$ of a bell-crank lever $j'$, $j^2$ pivoted at D. The arm $j^2$ serves for opening the exhaust valve $w$. The longitudinal axes of the levers $p$ pass approximately through the axis of the fixed shaft $h$, in order that no considerable turning effort shall be exerted on the lever $s$ by the actuating rod $t$ of the exhaust valve; similarly the line connecting the upper point of engagement of $q$ with $c$ and the axis of $n$ oscillates about the axis of the fixed shaft $h$.

Figure 12:
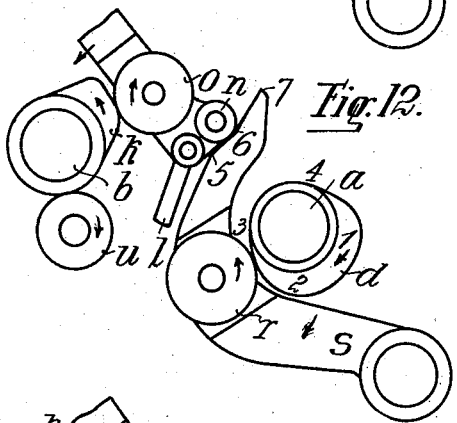
Figure 13:
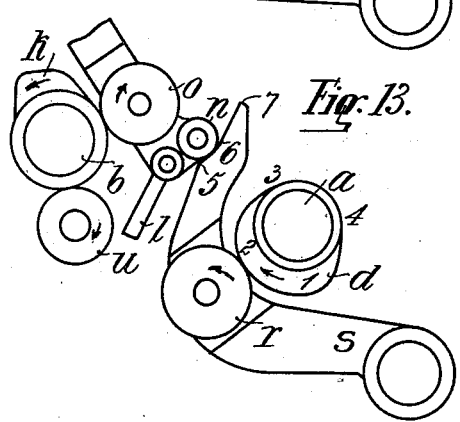

By reference to Figs. 5–14 the method of operation of the parts $k$, $o$, $r$, $d$ will appear. The shaft $a$ bears the actuating cam $d$ which, by means of the roller $r$, actuates an intermediate lever $s$ bearing the cam surfaces 5, 6, 7 in such a manner that, when the roller $r$ lies on the circular arcs 1, 2, and 4, 3 of the cam $d$ which arcs are concentric with the shaft $a$, the intermediate lever $s$, notwithstanding the motion of $d$, remains stationary by reason of the concentric arcs, consequently the intermediate lever $s$ can take up two limiting positions, one towards the cylinder, such for example as in Figs. 5, 7, 9, 11, 13 and 14, and another towards the actuating shaft $a$ as in Figs. 6 and 10. The transition of the intermediate lever $s$ from one limiting position to the other takes place by means of the cam surfaces 4, 1, and 2, 3 of $d$. Such intermediate positions are shown in Figs. 8 and 12.

In the position where the intermediate lever $s$ takes up the limiting position towards the cylinder, when the cam $k$ is in operation, the roller $n$ moves on the cam surface 6, 7, whereby the valve $x$ is opened. If on the other hand the intermediate lever $s$ takes up the limiting position towards the actuating shaft $a$, the roller $n$, when the cam $k$ is in operation, moves on the cam surface 5, 6 of the intermediate lever $s$ and the valve $x$ remains closed during the upward oscillation of the rod $q$.

For the first method of governing, Figs. 5, 7, 9 show the positions of the lower valve actuating parts relatively to each other at full load, half load, and no load for the lift or opening of the valve. The difference between Figs. 5, 7 and 9 lies only in the different positions of the governor-cam $d$. It will be clearly seen that the lift or opening of the valve must be constant, on account of the similar position of the actuating parts $k$, $o$, $n$, $s$. The cam $k$ is lifting.

In Fig. 8, the cam $d$ has no longer any influence on the amount of opening of the valve. By reason of the cam-guide, the valve in Fig. 8 is already closed and moreover closed earlier than in Fig. 6, as will be seen from a comparison of the positions of the cams k.

In comparing Fig. 12 with Fig. 10, it will again be seen that, according to the position of the cam k, the valve in Fig. 12 is raised later than in Fig. 10. The travel of the admission-valve varies for the different charges and is at its maximum at full load, and at its minimum at running light. It will be observed that the various travel-curves of the admission-valve coincide in certain parts and the travel-curve of maximum charge incloses the others.

Figs. 6 and 9 show the positions of the valve-actuating parts at closure of the valve for full load and half-load. Fig. 9 at the same time shows the closure of the valve at no load. The varying closure of the valve can be seen from the position of the cam k in Figs. 6, 8 and 9. Cam d governs forward.

Figure 10:
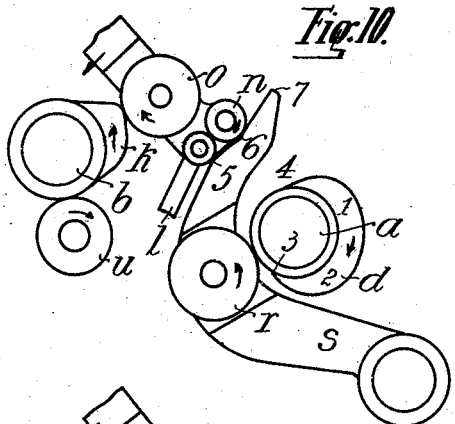
Figure 11:
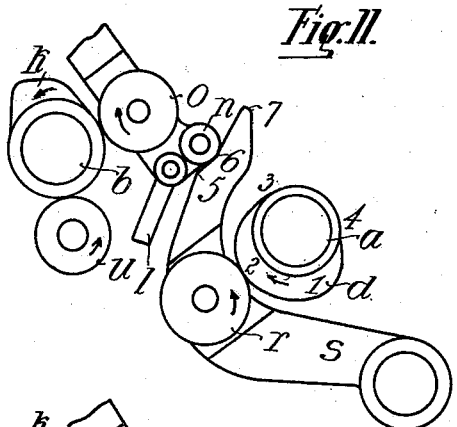
Figure 14:
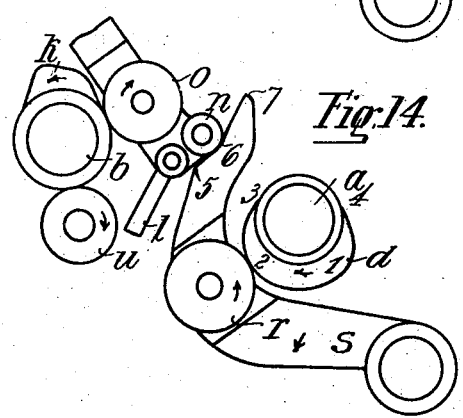
Figure 15:
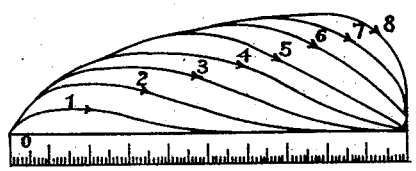

For the second method of governing, Figs. 10, 12 and 14 show the positions of the lower valve-actuating parts relatively to each other at full load, half-load and no load for the closure of the valve. The difference in Figs. 10, 12 and 14 lies only in the different positions of the governor-cam d. The cam k is moving down. The closure of the valve is constant. As can be seen from the position of the cam k in Figs. 10, 12 and 14 the opening of the valve is variable. Fig. 14 shows simultaneous lifting of the valve and closure of the valve for no load. The governor-cam d governs backwards, as can be seen from a comparison of Figs. 10, 12 and 14.

The cam d depending upon the direction of rotation of the shaft a varies the time either of the closing or the opening of the valve.

For the purpose of exactly controlling the valves, the forms of the parts of the cam k and of the parts 1, 2, 3, 4 of the cam d must be made to correspond.

The method of operation of the valve x can be seen from the diagram (Fig. 15). The curves 1, 2, 3—8 in the first place show that the opening of the valve always takes place in the same interval of time. Moreover they show how, with different positions of the balls of the governor, the time during which said valve is open is changed, furthermore, the amount of charge will also be shown by the diagram. It will be seen how the curves become larger with the increasing load.

What I claim as my invention and desire to secure by Letters Patent is:—

1. The combination, in an explosion-engine, of a side or way shaft, a cam on said shaft, a governer controlling the position of said cam on said shaft, a cam-lever actuated by said cam, an admission-valve, an actuating rod connected at one end to said admission-valve and sliding at its other end on the curved surface of said cam-lever, an auxiliary shaft, gearing for rotating said auxiliary shaft at half the speed of said way shaft, a tappet on said way shaft coacting with the side of said actuating rod, an exhaust valve, a second actuating rod connected at one end to said exhaust valve and coacting at its other end with the tappet on said auxiliary shaft, a coupling lever pivotally connected to the actuating rod of the exhaust valve and to said cam-lever, and a tensioning device elastically connecting said coupling lever and the actuating rod of the admission-valve.

2. The combination, in an explosion engine, of a side or way shaft, a cam on said shaft, a governor controlling the position of said cam on said shaft, a cam-lever actuated by said cam, an admission-valve, an actuating rod connected at one end to said admission-valve and sliding at its other end on the curved surface of said cam-lever, an auxiliary shaft, gearing for rotating said auxiliary shaft at half the speed of said way shaft, a tappet on said auxiliary shaft coacting with the side of said actuating rod at the cam-lever end of said rod, an exhaust valve, a second actuating rod connected at one end to said exhaust valve and coacting at its other end with the tappet on said auxiliary shaft on the opposite side of said auxiliary shaft to the actuating rod of the admission-valve, a coupling lever pivotally connected to the actuating rod of the exhaust valve and to said cam-lever, and a contracting spring link pivotally connecting said coupling lever and the actuating rod of the admission valve.

In testimony whereof I have hereunto set my hand in presence of two subscribing witnesses.

RUDOLF HENNIG.

Witnesses:
 MICHAEL ZIMMERMANN,
 LUITGOLD RUELL.